May 11, 1943.  D. E. GAMBLE  2,319,123
FRICTION CLUTCH
Filed June 26, 1939   2 Sheets-Sheet 2
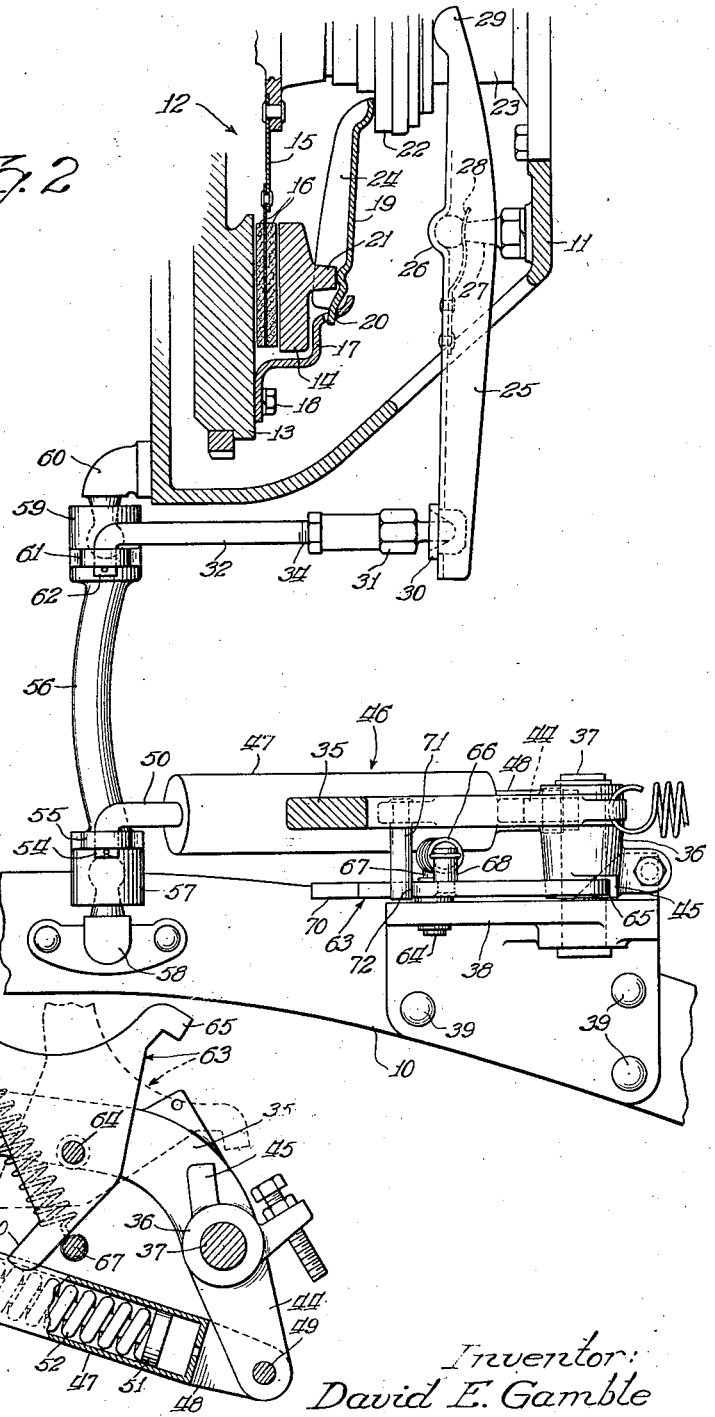
Inventor:
David E. Gamble
By: Edward C. Gritzbaugh
Atty.

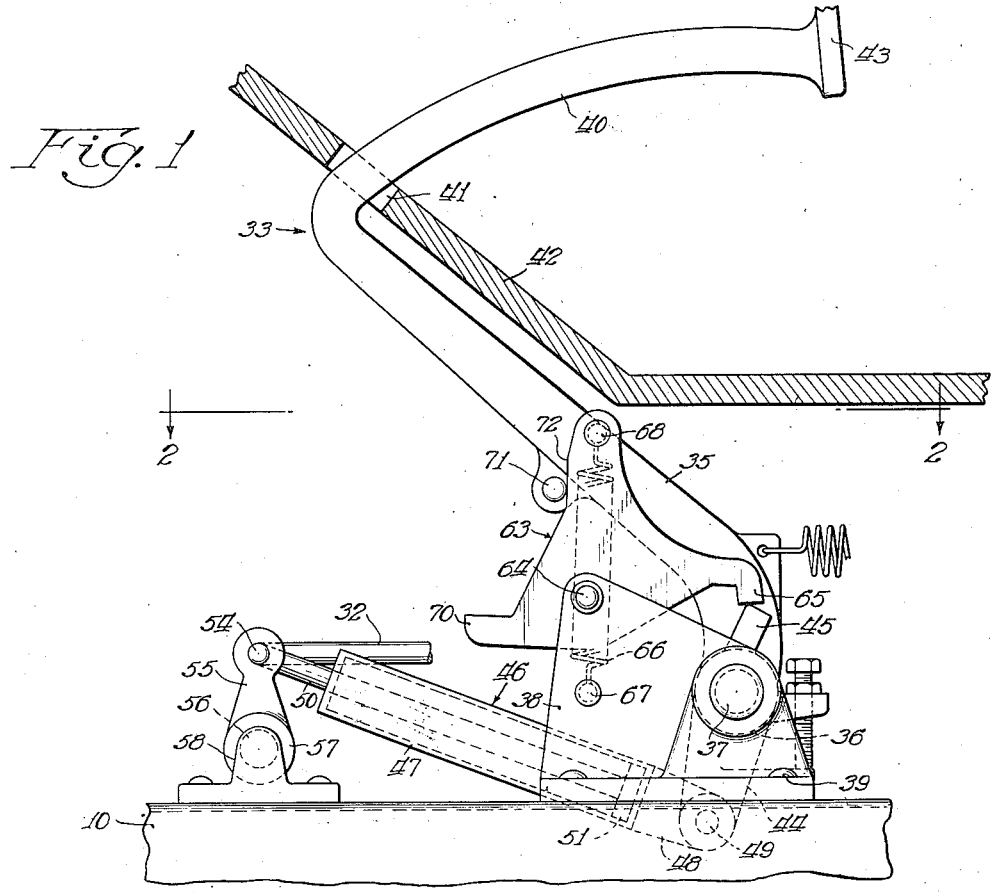
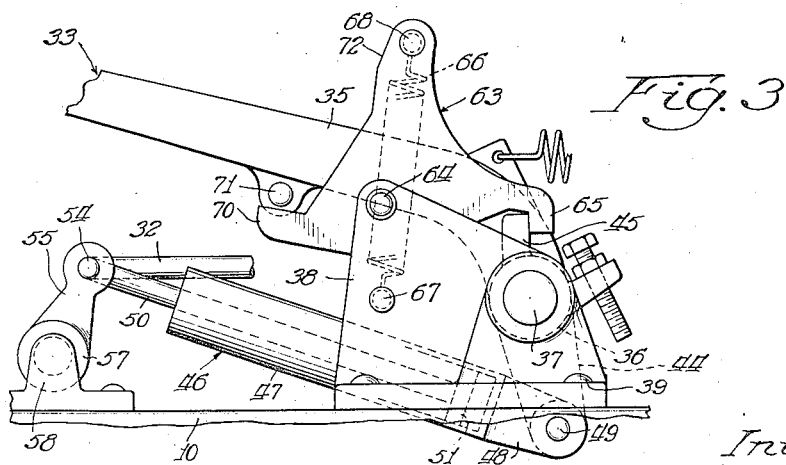

Patented May 11, 1943

2,319,123

UNITED STATES PATENT OFFICE 2,319,123

FRICTION CLUTCH

David E. Gamble, Chicago, Ill., assignor to Borg-Warner Corporation, Chicago, Ill., a corporation of Illinois Application June 26, 1939, Serial No. 281,140

8 Claims. (Cl. 192—99)

This invention relates to friction clutches of the type employed in motor vehicles for establishing a driving connection between the vehicle engine and the transmission, and has as its general object to provide a clutch that is adapted to be engaged under power developed by the operator, as contrasted with the conventional clutch that is released by power applied to it by the operator.

More specifically, the invention has as its object to provide a clutch and clutch operating mechanism arrangement wherein, in order to engage the clutch, the operator depresses the operating pedal until it becomes latched in clutch engaging position, and wherein, in order to release the clutch from engagement, it is only necessary to further depress the clutch, whereupon the latching mechanism will be rendered inoperative until the clutch has returned to clutch releasing position. Thus, the invention provides an arrangement wherein the clutch may be initially engaged by pedal pressure, and may be allowed to remain in engagement for an extended driving period without further application of pressure by the operator. The invention also provides for the release of the clutch by a conventional pedal depressing movement, and employs the same pedal for both clutch engagement and clutch release, thereby eliminating complication of controls.

The invention further aims to provide a mechanism, capable of carrying out the above stated objects, which is relatively simple and inexpensive in construction and yet positive and dependable in operation, and, in addition, is of thoroughly adequate strength and durability.

Other objects, the advantages and uses of my invention will become more apparent after reading the following specification and claims, and after consideration of the drawings forming a part of the specification wherein:

Fig. 1 is a vertical longitudinal sectional view through the floor board of a motor vehicle embodying the invention, showing portions of the clutch operating mechanism, in clutch released position;

Fig. 2 is a horizontal sectional view of the same, illustrating a portion of the clutch, taken as indicated by the line 2—2 of Fig. 1;

Fig. 3 is an elevation of a portion of the operating mechanism, shown in latched clutch engaging position; and Fig. 4 is an elevational view of the operating mechanism, in latch releasing position.

As an example of one form in which the invention may be embodied, I have shown in the drawings portions of a clutch and clutch operating mechanism of a motor vehicle including a side rail member 10, a clutch housing 11, and a clutch, indicated generally at 12, housed therein. The clutch 12 may include the conventional driving elements in the form of the engine flywheel 13, a pressure plate 14, a driven element 15 having facings 16 adapted to be engaged between the friction surfaces of the flywheel 13 and pressure plate 14, a cover 17 secured at 18 to the flywheel 13, and engagement levers 19 fulcrumed in openings 20 in the cover 17 and engaging against lugs 21 formed on the pressure plate 14 so as to transmit to the pressure plate 14, pressure received at their inner ends from a thrust bearing 22 mounted on the driven shaft 23. The levers 19 may be located in their radial positions by the embracing engagement of the lugs 21 between their side flanges 24, and of the ends of the slots 20 against the ends of the levers.

Engaging pressure is transmitted to the clutch by a rock lever 25 having a semi-spherical bearing region 26 fulcrumed against the spherical head of a post 27 mounted in the housing 11. A spring 28, secured to the rock lever 25, has a forked end portion engaging the neck of the post 27 so as to maintain the lever snugly in engagement with the post at all times. One end of the rock lever 25 has a fork 29 in engagement with the thrust bearing 22, and the other end is provided with a bearing socket 30 which receives the head member 31 of a thrust bar 32 forming part of the linkage for transferring clutch engaging pressure to the clutch from the operating pedal 33 shown in Fig. 1. The head 31 may be threaded as at 34 upon the thrust bar 32 so as to provide for adjustment of the linkage.

Referring now to Fig. 1, the operating pedal 33 includes a main lever portion 35 having a hub 36 mounted for rocking movement upon a stud shaft 37 secured in a bracket 38 which is affixed as at 39 to the chassis rail member 10. The upper end of the pedal 35 has a conventional arcuate portion 40 projecting through an opening 41 in the floor boards 42 of the vehicle, and terminating at its upper end in the foot engaging pedal portion 43.

At its lower end, the pedal 33 is provided with a lever arm 44 projecting downwardly from the stub shaft 37, and with a latch finger 45 projecting upwardly from the shaft 37.

The linkage for transferring pedal pressure to the clutch includes a yielding link, designated generally at 46. The yielding link 46 comprises a cylinder 47 having at one end a fork 48 receiving the lower end of the arm 44 and pivoted thereto by a pivot pin 49. The remainder of the yielding link 46 comprises a rod 50 entering one end of the cylinder 47 and formed with a head 51 slidable in the cyinder 47, and a compression spring 52 encircling the rod 50 inside of the cylinder 47 and engaged between the head 51 and the end 53 of the cylinder 47 through which the rod 50 extends.

The external end of the rod 50 is formed with an elbow 54 which is pivoted in the upper end of a lever 55 forming part of a floating link 56 one end of which has a socket 57 pivoted on a post 58 secured to the rail 10, and the other end of which is formed with a socket 59 pivoted on a post 60 secured to the housing 11. The said other end of the link 56 is formed with an arm 61, matching the arm 55. The thrust rod 32 has at its end an elbow 62 pivoted in the upper end of the arm 61.

The lever is adapted to be latched in clutch engaging position by a latching element 63 pivoted at 64 on the bracket 38 and having a hook portion 65 adapted, when the pedal 33 is moved to clutch engaging position, to drop behind the finger 45 and thereby latch the pedal in clutch engaged position, as shown in Fig. 3. When the pedal 33 is in clutch released position, the hook 65 rides upon the end of the finger 45 as shown in Fig. 1.

A coil spring 66, one end of which is attached to the bracket 38 by means of a post 67, and the other end of which is attached to the latching element 63 as by means of a post 68, is adapted to urge the hook 65 into engagement with the finger 45. In doing so, the spring 66 exerts its pull on the right hand side of the pivot 64 of the latching element 63. When the latching element is thus urged into engagement with the finger 45, either in the unlatched position of Fig. 1 or in the latched position of Fig. 3, it is in what I prefer to term its "operative position."

The latching element 63 has an inoperative position, shown in Fig. 4, wherein the hook 65 is maintained in a raised position, clear of the finger 45, thus allowing the pedal 33 to return from clutch engaging to clutch disengaged position, without interference from the latching element. The spring 66 is adapted to hold the latching element in this position, exerting its pull in this case on the left-hand side of the pivot 64. In moving from its operative to its inoperative position and vice versa, the latch thus moves across dead center of the pull of the spring 66.

For moving the latching element 63 to its inoperative position, it is provided with a projecting tail portion 70 which is adapted to be engaged by a pin 71 carried by the pedal 33. In order to bring the pin 71 into engagement with the projecting portion 70, the pedal 33 must be depressed beyond clutch engaging position. It may be noted by referring to Fig. 3 that in the clutch engaging position, the pin 71 is spaced just a trifle above the projecting tail portion 70. A slight further depression of the pedal causes the pin 71 to engage the tail portion 70 and to throw the latching element 63 over to its inoperative position. Fig. 4 shows the pedal in the position to which it has been depressed in order to accomplish the throw-over.

From this position, the clutch pedal may be allowed to return toward clutch disengaged position, the latching element 63 being maintained by the spring 66 in the inoperative position wherein the hook portion 65 is elevated clear of the finger 45, allowing the latter to move back to a position wherein, when the latching element is returned to its operative position, the hook 65 will engage the end of the finger 45 and ride thereon as in Fig. 1.

In order to return the latching element to its operative position, it is provided with a projecting portion 72 which is adapted to be engaged by the pin 71 subsequent to the time that the finger 45 has been retracted past its latching position. As the pedal continues to move upwardly, the pin 71 will push the latching element back past dead center, whereupon the latching element will snap down to its operative position.

The latching position is preferably arranged so that full clutch engagement may be secured before latching takes place. The arrangement may be such that after full clutching engagement has been attained, it is necessary to compress the spring 52 somewhat in order to effect latching of the pedal. Thus the operator may engage and release the clutch for the purpose of certain driving operations, without having the clutch become latched. For example, when driving in traffic, when backing, when maneuvering the vehicle in a parking space, and for other operations wherein frequent engagement and disengagement of the clutch may be necessary or desirable, the operator may avoid the latching in of the operating pedal and yet have full control of his clutching operation. The latching may then be employed upon sustained driving operation wherein it is desired to be relieved of the necessity of maintaining pressure upon the clutch pedal.

The invention has the advantage of enabling the operator to determine the clutching pressure in accordance with the amount of pressure which he applies to the pedal, instead of relying upon his ability to hold back the pressure of the springs which, in the conventional clutch, provide clutch engaging pressure. It makes it possible for him to obtain a more delicate control over clutch pressure with less effort than in the conventional clutch.

I claim:

1. Operating mechanism for a friction clutch adapted to be engaged under power developed by the operator, comprising an operating lever, a latching element pivoted on a fixed support for movement from an operative position wherein it is adapted, when the lever is advanced to clutch engaging position, to latch the lever in that position, to an inoperative position, over center with relation to said operative position, wherein the lever is free to return from clutch engaging to clutch releasing position, and a spring coacting with said latching element for holding it in either said operative or said inoperative position, said latching element being adapted to be engaged by the lever upon advancement of the latter beyond clutch engaging position so as to cause said latching element to assume its inoperative position, and being adapted to be engaged by the lever upon return of the lever from clutch engaging to clutch releasing position, so as to cause said latching element to resume its operative position.

2. Operating mechanism for a friction clutch, comprising a foot pedal, linkage for yieldably transferring clutch engaging pressure from said pedal to said clutch, a latching element pivoted on a fixed support for movement from an operative position wherein it is adapted, when the pedal is depressed to clutch engaging position, to latch the pedal in that position, to an inoperative position wherein the pedal is free to return from clutch engaging to clutch releasing position, and a spring coacting with said element for holding it in either its operative or its inoperative position, said element having a projecting portion adapted to be engaged by said pedal upon depression of the latter beyond clutch engaging position, so as to cause said element to assume its inoperative position, and having another projecting portion adapted to be engaged by the pedal upon return of the pedal from clutch engaging to clutch releasing position, so as to cause said element to assume its operative position.

3. Operating mechanism for a clutch adapted to be engaged under pressure developed by the operator, comprising an operating pedal, fixed supporting means on which said pedal is mounted for rocking movement on a horizontal axis, said pedal having an upwardly projecting latching finger and a downwardly projecting arm, linkage attached at one end to said arm and at its other end adapted to impose clutch engaging pressure upon said clutch, said linkage including an element adapted to yield at clutch engaging pressure so as to allow the pedal to be advanced beyond clutch engaging position, a latching element pivoted to said fixed supporting means and including a hook portion adapted to coact with said latching finger for latching the pedal in clutch engaging position, and a spring coacting between said latching element and said fixed supporting means for yieldably maintaining said latching element either in an operative position wherein said hook is adapted to coact with said finger, or in an inoperative position wherein said hook is raised clear of said finger, said latching element having a projecting portion adapted to be engaged by the pedal upon movement thereof beyond clutch engaging position so as to move the latching element to its inoperative position, and having another projecting portion adapted to be engaged by the pedal upon return movement thereof from clutch engaging to clutch releasing position so as to move the latching element back to its operative position.

4. In combination with an automobile including a clutch and a chassis rail, operating mechanism for causing engagement of said clutch by manual pressure, including a bracket mounted upon said chassis rail member, an operating pedal pivoted on said bracket, linkage for yieldingly transferring clutch engaging pressure from said pedal to the clutch, a latching element pivoted on said bracket for movement from an operative position wherein it is adapted, when the pedal is depressed to clutch engaging position, to latch the pedal in that position, to a position wherein the pedal is free to return from clutch engaging to clutch releasing position, a spring, attached at its respective ends to said latching element and to said bracket on opposite sides of the latch pivot, and adapted to cross the axis of said pivot in the movement of the latching element from one to the other of its said positions, and to hold said latching element in either of its said positions, said latching element being adapted to be engaged by the pedal upon depression thereof beyond clutch engaging position, so as to be moved to its inoperative position, and being adapted to be engaged by the pedal upon return movement thereof from clutch engaging to clutch releasing position, so as to be moved back to its operative position.

5. Operating mechanism for a clutch adapted to be engaged under pressure developed by the operator, in a vehicle wherein such clutch is spaced from a side rail of the vehicle, comprising a foot pedal fulcrumed on one of said side rails, linkage for transferring clutch engaging pressure from said pedal to said clutch, said linkage including a floating rock shaft extending between said side rail and the clutch and including an element adapted to yield at clutch engaging pressure so as to allow the pedal to be advanced beyond clutch engaging position, and latching means adapted to latch the pedal in clutch engaging position and to release the pedal for return movement when the pedal is depressed beyond clutch engaging position.

6. Operating mechanism for a clutch adapted to be engaged under power developed by the operator, comprising an operating pedal, a fixed frame member on which said pedal is pivoted, means for yieldingly transferring clutch engaging pressure from the pedal to the clutch, when the pedal is depressed, a latching element pivoted on said support for movement from an operative position wherein it is adapted, when the pedal is depressed to clutch engaging position, to latch the pedal in that position, to an inoperative position wherein the pedal is free to return from clutch engaging to clutch releasing position, said element having an integral projecting portion adapted to be engaged by said pedal upon depression of the latter beyond clutch engaging position, so as to cause said element to assume its inoperative position, and having another integral projecting portion adapted to be engaged by the pedal upon return of the pedal to clutch releasing position, so as to cause said element to assume its operative position.

7. Operating mechanism for a clutch adapted to be engaged under pressure developed by the operator, comprising an operating pedal, a fixed support on which said pedal is mounted for rocking movement on a horizontal axis, said pedal having an upwardly projecting latching finger and a downwardly projecting arm, linkage attached at one end to said arm and at its other end adapted to impose clutch engaging pressure upon said clutch, said linkage including an element adapted to yield at clutch engaging pressure so as to allow the pedal to be advanced beyond clutch engaging position, a latching element mounted upon said support for movement from an operative position wherein it is adapted, when the pedal is depressed to clutch engaging position, to engage said finger so as to latch the pedal in that position, to an inoperative position wherein the lever is free to return to clutch releasing position, said latching element having a projecting portion adapted to be engaged by the pedal upon movement thereof beyond clutch-engaging position so as to move the latching element to its inoperative position, and having another projecting portion adapted to be engaged by the pedal upon the return movement thereof from clutch engaging to clutch releasing position so as to move the latching element back to its operative position.

8. Operating mechanism for a clutch adapted to be engaged under pressure developed by the operator, comprising an operating pedal, a fixed support on which said pedal is mounted for rocking movement on a horizontal axis, said pedal having an upwardly projecting latching finger and a downwardly projecting arm, linkage attached at one end to said arm and at its other end adapted to impose clutch engaging pressure upon said clutch, said linkage including an element adapted to yield at clutch engaging pressure so as to permit the pedal to be advanced beyond clutch engaging position, a latching element mounting upon said support for movement from an operative position wherein it is adapted, when the pedal is depressed to clutch engaging position, to engage said finger so as to latch the pedal in that position, to an inoperative position wherein the pedal is free to return to clutch releasing position, and means associated with said latching element, adapted to be engaged by said pedal upon depression thereof beyond clutch engaging position, for moving the latching element from its operative to its inoperative position.

DAVID E. GAMBLE.